United States Patent Office 3,597,149
Patented Aug. 3, 1971

3,597,149
INHIBITION OF GAS-FUME FADING OF DYED
CELLULOSE ACETATE MATERIAL
Kyo Masuda, Suita-shi, and Shizuo Nishino and Yoshiaki Hasegawa, Kyoto, Japan, assignors to Showa Denko Kabushiki Kaisha, Tokyo, and Meisei Chemical Works, Co., Ltd., Kyoto, Japan
No Drawing. Filed Apr. 29, 1969, Ser. No. 820,327
Int. Cl. D06p 5/02
U.S. Cl. 8—165                                    10 Claims

ABSTRACT OF THE DISCLOSURE

A method of improving the color fastness of dyed cellulose acetate material with a specified bis(benzylamino) derivative as a gas-fume of fading inhibitor.

---

This invention relates to an improvement in inhibition method of gas-fume fading of dyed cellulose acetate material.

It is known that materials consisting of, or containing, dyed cellulose acetate fibers tend to fade when they are exposed to an atmosphere containing oxides of nitrogen and sulfur. This phenomenon is generally referred to as gas- or acid-fume fading. Numbers of attempts to prevent such gas-fume fading have been proposed, including U.S. Pats. Nos. 2,416,380, 2,541,822, 2,546,167, and 2,567,130, and British Pat. No. 641,459. In all of the named literatures, dyed cellulose acetate materials are treated with specific diamine or amidine compounds as gas-fume fading inhibitors or anti-fume agents. However, among those known anti-fume agents, diamine type compounds tend to degrade the light fastness of dyed colors and also themselves cause discoloring of dyed materials, while they exhibit notable gas-fume fading inhibition effect. Whereas, amidine type compounds show none of such discoloring action, but exhibit relatively less inhibition effect on gas-fume fading. Furthermore, anti-fume agent having equivalent fading prevention effect on both types of cellulose acetate, i.e., diacetate and triacetate, has not yet been found. It has been occasionally observed that an anti-fume agent effective with diacetate is substantially ineffective with triacetate. Diphenylacetoamidine is a typical anti-fume agent most commonly used at present, because of its advantageous property that the compound itself causes no discoloring of dyed materials. The compound, however, is effective for treating dyed cellulose diacetate, but shows hardly any gas fume fading inhibition action for triacetate.

It is now found that the below-specified bis(benzylamino) compounds are free from all of the foregoing defects inherent in conventional anti-fume agents, and can be used as excellent anti-fume agents.

Accordingly, therefore, the object of the present invention is to provide an improved process for inhibiting gas-fume fading of dyed cellulose acetate material, using specific anti-fume agents which are effective both for cellulose diacetate and triacetate, and themselves cause no discoloring or degradation in light fastness of dyed materials.

The compounds employed as the anti-fume agents in this invention are bis(benzylamino) derivatives expressed by a general formula,

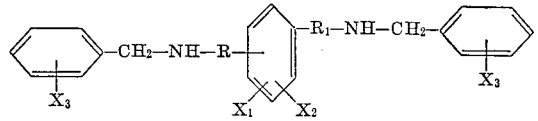

in which R and $R_1$ aer each an alkylene group of a formula $-(CH_2)_n-$, $n$ being an integer of 1–3; $X_1$ and $X_2$ are each a member of the group consisting of hydrogen and methyl; and $X_3$ is a member of the group consisting of hydrogen, methyl and ethyl.

The positions of substituents on the benzene rings of R and $R_1$ are preferably at meta or para relation. Compounds expressable by a similar formula in which R and $R_1$ are alkylene groups having more than three carbons do not give the desired anti-fume effect.

Specific compounds of the above formula and which are suitable as the antifume agents of this invention include:

N,N'-dibenzylzylylenediamine,
Bis(benzylaminomethyl)-2,5-dimethylbenzene,
N,N'-bis(p-methylbenzyl)-xylylenediamine,
Bis(m-methylbenzylaminoethyl) benzene,
Bis(benzylaminoethyl) benzene,
Bis(p-methylbenzylaminoethyl) benzene, and
Bis(benzylaminopropyl) benzene.

The bis(benzylamino) derivatives can be easily prepared at high yields, by subjecting corresponding bis (aminoalkyl) benzene and benzyl halide or methyl- or ethyl-benzylhalide to dehydrohalogenation reaction. The reaction products are normally obtained as oily or solid substances which are difficultly soluble in water.

The above bis(benzylamino) derivatives are used as anti-fume agents, in the treatment of cellulose acetate and materials in the conventional modes of operation. That is, addition of special procedure or alteration of treating conditions is not required, but the treatment can be effectively practiced using conventional apparatus under conventionally employed conditions.

Thus, the application of bis(benzylamino) derivatives to cellulose acetate fibers or frabics can be effected simultaneously with any of the procedures such as printing, dyeing, scouring, optical brightening, etc., or separately after the foregoing procedures. Preferred embodiments will be explained hereinbelow.

When the anti-fume treatment is practiced simultaneously with printing, the bis(benzylamino) compound is mixed with the printing paste as it is, or as dissolved in a suitable solvent. Whereas, if it is performed simultaneously with scouring, optical brightening or dyeing, or separately after such procedures, the compound is added to a pertinent bath as it is, or in emulsified form. Therefore, excepting the first case of applying it with printing paste, the compound can be more conveniently used if it is converted in advance to a self-emulsifiable liquid composition by blending it with a surface active agent, and if necessary, organic solvent. While any known surface active agents can be used for this purpose, those of anion or nonion type are preferred. Examples of such surface active agents include: higher alcohol sulfates, sulfates of higher alcohol-ethylene oxide adducts; sulfates of higher fatty acid-ethylene oxide adducts; sodium alkylbenzenesulfonate, castor oil sulfate, oleic alcohol sulfate, sulfates of higher alcohol esters, higher fatty acid-α-sulfonate, higher alcohol-ethylene oxide adduct, higher fatty acid-ethylene oxide adduct, ethylene oxide adducts of sorbitan, ethylene oxide adducts of alkylphenol, etc. Also as the organic solvent, hydrophilic solvents are preferred, to secure better dispersion of the composition in aqueous baths. Examples of suitable organic solvents include lower alcohol, lower ketone, cyclohexanone, dioxane, polyhydric alcohol, dimethylformamide, dimethylsulfoxide, dimethylacetamide, and acetamide.

In the self-emulsifiable composition composed of a bis(benzylamino) compound, surface active agent and organic solvent, the quantitative ratio of each component is suitably variable. In preferred embodiments, the compound occupies at least 10 wt. percent, the surface active agent 20–50 wt. percent, and the organic solvent 10–70 pt. percent. The amount of the bis(benzylamino) compound itself, as a gas-fume fading inhibitor, is normally within the range of 10–30 wt. percent, preferably 50–200 wt. percent, based on the dyestuff employed.

According to the above-described invention, excellent gas-fume fading inhibition effect can be imparted both to cellulose diacetate and triacetate materials.

Hereinafter the invention will be explained with reference to working examples, in which the parts and percentages are by weight. The color fastness of treated dyed cellulose diacetate and triacetate against gas-fume was measured in accordance with A.A.T.C.C. 23–1946 (Technical Manual of the American Association of Textile Chemists and Colorists). Also the measurement of light fastness followed the method disclosed in A.A.T.C.C. 16A–1964. The gas-fume fastness was evaluated in five ranks, that is, from class 1 to class 5, in which class 1 or 2 denotes poor, class 3 good, class 4 very good, and class 5 excellent.

In Controls, diphenylacetoamidine were used as anti-fume agent in the same manner as the bis(benzylamino) compounds in these examples, said diphenylacetoamidine being the most popular of conventionally employed anti-fume agents.

EXAMPLE 1

272 parts of meta- and para-xylylenediamine mixture (para-isomer content: 29%) and 504 parts of benzyl chloride were reacted at 85° C. in the presence of 1,000 parts of 20% aqueous caustic soda. Five hundred (500) parts of thus obtained N,N'-dibenzylxylylenediamine was mixed with 300 parts of sodium octylphenoxyhexadecylethenoxyethyl sulfate (surface active agent), 100 parts of cetyl alcohol-ethylene oxide adduct (surface active agent), and 100 parts of isopropanol as an organic solvent, an stirred. Thus 1,000 parts of a transparent liquid composition was obtained.

Separately, a cellulose triacetate fabric was immersed in a dye bath at a liquor ratio 1:5 containing 1% based on the dry fabric weight of dyestuff. Celliton Fast Pink-FF3B (BASF). The temperature of the bath was raised to 120° C. consuming 30 minutes, and at that temperature the fabric was jigger-dyed for additional 30 minutes, followed by washing with water and drying (80° C., 3 minutes). The dyed fabric was immersed in 1,000 parts of a dispersion formed by dispersing 25 parts of the aforesaid liquid composition in water, squeezed until the residual liquid content reached 40%, and dried at 70–75° C. for 3 minutes.

As Controls, same fabric treated in a liquid containing same amount to N,N'-dibenzylxylylenediamine of diphenylacetoamidine, and untreated fabric were prepared.

The gas-fume fastness and light fastness of foregoing three fabrics were tested, with the results as given in Table 1 below.

TABLE 1

| Dyed fabric | Gas-fume fastness | Light fastness |
|---|---|---|
| The fabric treated in accordance with this invention. | Good | 4 |
| Control: diphenylacetoamidine-treated fabric. | Poor | 4 |
| Control: untreated fabric | do | 4 |

Also a white cellulose triacetate fabric was treated in a liquid containing N,N'-dibenzylxylylenediamine but no dyestuff. The white fabric was completely free from coloration, and when exposed to nitrogen oxide gas, and to sunlight for 20 hours, neither developed any color or abnormality.

EXAMPLE 2

328 parts of 1,4-diaminomethyl-2,5-dimethylbenzene and 1,000 parts of 20% aqueous caustic soda were heated to 80° C., and while stirring the system, 504 parts of benzyl chloride was added thereto. Five hundred (500) parts of thus obtained 1,4-bis(benzylaminomethyl)-2,5-dimethylbenzene, 300 parts of sodium octylphenoxyhexadecylethenoxyethyl sulfate, 100 parts of cetyl alcohol-ethylene oxide adduct, and 100 parts of isopropanol were mixed and stirred to provide 1,000 parts of a transparent liquid composition.

A cellulose diacetate taffeta was immersed in a dye bath at a liquid ratio 1:30 containing 1% based on the dry fabric weight of Cibacet Turquoise Blue-G (CIBA Ltd.) and 2% of the aforesaid liquid composition. The bath was gradually heated to 75–85° C. consuming 30 minutes, and the taffeta was dyed at said temperature for additional 60 minutes. Thus dyed fabric was washed with water and dried at 70–75° C. for 3 minutes. As controls, same taffeta was dyed in a bath containing no anti-fume agent, and also in a bath containing same amount to said bis-(benzylamino) compound of diphenylacetoamidine. The test results of those three samples were as given in Table 2 below.

TABLE 2

| Dry fabric | Gas-fume fastness | Light fastness |
|---|---|---|
| Control: untreated fabric | Poor | 4–5 |
| Control: diphenylacetoamidine-treated fabric | Good | 4–5 |
| Fabric treated by the method of this invention | Very good | 4–5 |

Also a white cellulose diacetate fabric was immersed in a bath containing 2.5% of the liquid composition of this invention but no dyestuff, dried and exposed to nitrogen oxide gas and sunlight similarly to Example 1. The fabric exhibited no coloration or other changes.

EXAMPLE 3

A mixture consisting of 245 parts of para-xylylenediamine and 900 parts of 20% aqueous caustic soda was heated to 80° C., and to which 505 parts of para-methylbenzyl chloride was added dropwise under stirring. Five hundred (500) parts of thus obtained N,N'-di(p-methylbenzyl)-p-xylylenediamine was dissolved in 500 parts of dimethylformamide at 50° C., and the resulting composition was blended with a printing paste. Also as Controls, a printing paste containing no anti-fume agent, and that containing the same amount to N,N'-di(p-methylbenzyl)-p-xylylenediamine of diphenylacetoamidine were prepared. The blend ratio of the paste was as follows:

|  | Parts |
|---|---|
| Phenacet Blue-FGD (GDC) | 20 |
| Liquid composition of the invention | 20 |
| Sodium alginate (6 g./100 cc. of water) | 500 |
| Water, balance to form 1,000 parts of the paste. | |

A cellulose triacetate taffeta was printed with the above paste, dried on a 100–110° C. cylinder for 5 minutes, and thereafter steam-heated at 120° C. for 20 minutes. The fabric was then treated in 1,000 parts of a reduction clearing bath containing 0.5 part of caustic soda and 1.0 part of hydrosulfite, at 60° C. for 10 minutes, followed by washing with water and dried (80° C., 5 minutes). Thus obtained printed fabric was tested of gas-fume fastness and light fastness, with the result as given in Table 3 below.

TABLE 3

| Printed fabric | Gas-fume fastness | Light fastness |
|---|---|---|
| Control: printed with the paste containing no anti-fume agent. | Poor | 4–5 |
| Control: diphenylacetoamidine-added paste | do | 4–5 |
| Printing paste added with an anti-fume agent of this invention. | Very good | 4–5 |

When a white cellulose triacetate was similarly treated using a paste containing the anti-fume agent of this invention but no dyestuff, the fabric showed no change during the subsequent exposure test to nitrogen oxide gas and sunlight.

EXAMPLE 4

Three hundred and twenty-eight (328) parts of 1,3-bis($\beta$-aminoethyl) benzene and 1,000 parts of 20% aqueous caustic soda were heated to 70° C., and to which 560 parts of meta-methylbenzyl chloride was dropped under stirring. Five hundred (500) parts of 1,3-bis(meta-methylbenzylaminoethyl) benzene thus obtained as the reaction product was heated and dissolved with 300 parts of sodium octylphenoxyhexadecylethenoxyethyl sulfate and 200 parts of cyclohexanone at 50° C., to form 1,000 parts of a liquid composition. Twenty-five (25) parts of this composition was dispersed in water to form 1,000 parts of a treating bath.

Separately, a cellulose diacetate fabric was dyed using a dyeing machine at a liquor ratio of 1:30, at 70–80° C. for 60 minutes, in a dye bath containing 1% to the fabric of Cellanthrene Brilliant Blue-FFSK (du Pont). The dyed fabric was washed with water and dried, and immersed in the aforesaid treating bath, followed by squeezing (residual liquid content: 40%) and drying (70–75° C., 3 minutes). The test results of its gas-fume fastness and light fastness were as follows:

TABLE 4

| Dyed fabric | Gas-fume fastness | Light fastness |
|---|---|---|
| Control: untreated fabric | Poor | 5 |
| Control: diphenylacetoamidine-treated fabric | do | 5 |
| Fabric treated in accordance with this invention | Good | 5 |

EXAMPLE 5

Five hundred (500) parts of a 1,3- and 1,4-bis(benzylaminoethyl) benzene mixture obtained from 328 parts of 1,3-, and 1,4-bis($\beta$-aminoethyl) benzene and 504 parts of benzyl chloride similarly to Example 4, was mixed with 300 parts of sodium sulfate of acetyl alcohol-ethylene oxide adduct, 100 parts of cetyl alcohol-ethylene oxide adduct, and 100 parts of methanol. The mixture was heated to 50° C. and converted to 1,000 parts of a transparent liquid composition.

The same composition was diluted by 100 times with water, and added to the scouring bath of the following composition, in an amount of 2% to the fabric to be treated.

| | Parts |
|---|---|
| Nonylphenyl-ethylene oxide adduct | 2 |
| Sodium alkylnaphthyl sulfonate | 2 |
| Aqueous ammonia | 0.2 |
| Water, balance to make the total composition 1,000 parts. | |

A cellulose diacetate fabric was treated in the scouring bath at a liquor ratio of 1:10, at 60° C. for 60 minutes, followed by aqueous washing and drying (70–75° C., 3 minutes). Separately, similar scouring baths each containing no anti-fume agent and containing diphenylacetoamidine were prepared, and the cellulose diacetate was scoured in the baths.

Then the scoured fabrics were dyed in a bath containing 1% to the fabric of Celliton Fast Green B (BASF), at a liquor ratio of 1:30. The bath temperature was raised to 75–80° C. from room temperature, consuming initial 30 minutes, and dyeing was continued for additional 60 minutes at said temperature. After subsequent washing with water and drying (70–75° C., 3 minutes), the samples were tested for gas-fume fastness and light fastness, with the results as in Table 5.

TABLE 5

| Dyed fabric | Gas-fume fastness | Light fastness |
|---|---|---|
| Control: no anti-fume agent used | Poor | 2-3 |
| Control: diphenylacetoamidine-treated | Good | 2-3 |
| Treated with an anti-fume agent of the invention | Very good | 2-3 |

When a white cellulose diacetate fabric was treated in a bath containing the anti-fume agent of this invention but no dyestuff, and exposed to nitrogen oxide gas and sunlight, no yellowing was observed.

EXAMPLE 6

Five hundred (500) parts of 1,4-bis-(para-methylbenzyl aminoethyl) benzene obtained from 295 parts of 1,4-bis ($\beta$-aminoethyl) benzene and 505 parts of para-methylbenzyl chloride in the manner similar to Example 4, was heated and stirred together with 300 parts of sodium sulfate of cetyl alcohol-ethylene oxide adduct, 100 parts of cetyl alcohol-ethylene oxide adduct and 100 parts of isopropanol. Thus 1,000 parts of a transparent liquid composition was obtained.

In a high pressure dyeing machine, a dye bath containing 2% to the fabric of the above composition and 1% to the fabric of Diacelliton Fast Green B (BASF) was prepared, and in which a cellulose triacetate taffeta was immersed at a liquor ratio of 1:20. The bath temperature was gradually raised to 120° C. from 40° C. consuming 30 minutes, and at 120° C. the dyeing was continued for 60 minutes.

Thus dyed fabric was treated in 1,000 parts of a soaping bath containing 2 parts of dodecyl alcohol-ethylene oxide adduct at a liquor ratio of 1:30 at 80° C. for 20 minutes, followed by aqueous washing and drying at 70–75° C. for 3 minutes. Also as Controls, similar cellulose triacetate taffeta was treated in the same dye bath except containing no anti-fume agent, and also in a bath containing the same amount to 1,4-bis-(para-methylbenzylaminoethyl) benzene of diphenylacetoamidine, followed by identical soaping treatment as above. The test results of the three samples were as given in Table 6 below.

TABLE 6

| Dyed fabric | Gas-fume fastness | Light fastness |
|---|---|---|
| Control: no anti-fume agent | Poor | 2 |
| Control: diphenylacetoamidine added | do | 2 |
| Treated in accordance with this invention | Very good | 2 |

When white cellulose triacetate taffeta was treated in a bath containing the anti-fume agent of this invention but no dyestuff, and exposed to nitrogen oxide gas and sunlight, no objectionable coloring was observed.

EXAMPLE 7

Five hundred (500) parts of 1,4-bis(benzylaminopropyl) benzene obtained from 346 parts of 1,4-bis(aminopropyl) benzene and 455 parts of benzyl chloride in the manner similar to Example 4, was blended with 300 parts of sodium sulfate of cetyl alcohol-ethylene oxide adduct, 100 parts of cetyl alcohol-ethylene oxide adduct, and 100 parts of isopropanol.

A cellulose triacetate taffeta was immersed in a bath containing 2% to the fabric of above-described composition, 1.5% of an optical brightening agent (Uvitex ER N, Ciba Ltd.) and 3% of nonylphenyl-ethylene oxide adduct, and the bath was heated to boiling point from room temperature consuming 20 minutes, and kept boiling for further 60 minutes. The fabric was washed with water, dried and tested of gas-fume fastness and light fastness.

As Controls, brightening baths containing no anti-fume agent and containing the same amount to 1,4-bis(benzylaminopropyl) benzene of diphenylacetoamidine alone were prepared, and the same cellulose triacetate taffeta was treated in those baths. The test results were as given in Table 7 below.

TABLE 7

| Optical brightened fabric | Gas-fume fastness | Light fastness |
|---|---|---|
| Control: no anti-fume agent used | Poor | 2 |
| Control: diphenylacetoamidine added | do | 2 |
| Treated in accordance with this invention | Good | 2 |

We claim:
1. In the method of improving color fastness of dyed cellulose acetate material against gas-fume fading by treating the material with a gas-fume fading inhibitor, the improvement wherein the gas-fume fading inhibitor is a compound of the general formula

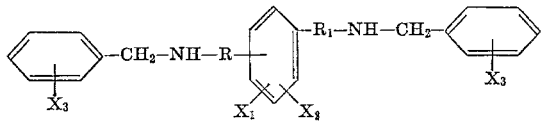

in which R and $R_1$ are each an alkylene group of a formula $-(CH_2)_n-$, $n$ being an integer of 1–3, $X_1$ and $X_2$ are each a member of the group consisting of hydrogen and methyl; and $X_3$ is a member of the group consisting of hydrogen, methyl and ethyl.

2. The method of claim 1, in which the cellulose acetate is cellulose diacetate.

3. The method of claim 1, in which the cellulose acetate is cellulose triacetate.

4. The method of claim 1, in which the gas-fume fading inhibitor is N,N'-dibenzylxylylenediamine.

5. The method of claim 1, in which the gas-fume fading inhibitor is bis(benzylaminomethyl)-2,5-dimethyl benzene.

6. The method of claim 1, in which the gas fume fading inhibitor is N,N'-bis(p-methylbenzyl)-xylylenediamine.

7. The method of claim 1, in which the gas-fume fading inhibitor is bis(meta-methylbenzylaminoethyl) benzene.

8. The method of claim 1, in which the gas-fume fading inhibitor is bis(benzylaminoethyl) benzene.

9. The method of claim 1, in which the gas-fume fading inhibitor is bis(p-methylbenzylaminoethyl) benzene.

10. The method of claim 1, in which the gas-fume fading agent is bis(benzylaminopropyl) benzene.

References Cited

UNITED STATES PATENTS

| | | | |
|---|---|---|---|
| 3,101,236 | 8/1963 | Salvin | 8—165 |
| 3,217,039 | 11/1965 | Humber | 260—570.5 |
| 2,982,597 | 5/1961 | Salvin | 8—165 |

DONALD LEVY, Primary Examiner

B. BETTIS, Assistant Examiner

U.S. Cl. X.R.

8—74, 54.2